United States Patent
Rigney et al.

(10) Patent No.: US 8,576,059 B2
(45) Date of Patent: Nov. 5, 2013

(54) TIRE MONITORING SYSTEMS AND METHODS

(75) Inventors: Brian P. Rigney, Raleigh, NC (US);
Larry Schlesinger, Bahama, NC (US);
Miguel B. Cavas, Raleigh, NC (US)

(73) Assignee: Dill Air Controls Products, LLC,
Oxford, NC (US)

(*) Notice: Subject to any disclaimer, the term of this patent is extended or adjusted under 35 U.S.C. 154(b) by 342 days.

(21) Appl. No.: 13/029,668

(22) Filed: Feb. 17, 2011

(65) Prior Publication Data

US 2012/0212334 A1     Aug. 23, 2012

(51) Int. Cl.
*B60C 23/00*     (2006.01)
(52) U.S. Cl.
USPC .......... 340/442; 340/445; 340/447; 73/146.4; 73/146.5; 73/146.8; 116/34 R
(58) Field of Classification Search
USPC ................................................ 340/442, 447
See application file for complete search history.

(56) References Cited

U.S. PATENT DOCUMENTS

| | | | |
|---|---|---|---|
| 6,016,102 A * | 1/2000 | Fortune et al. ................. | 340/442 |
| 2004/0095231 A1 | 5/2004 | Ichinose | |
| 2006/0187014 A1 | 8/2006 | Li et al. | |

FOREIGN PATENT DOCUMENTS

| | | |
|---|---|---|
| JP | 08-207522 | 8/1996 |
| JP | 2006/272995 | 10/2006 |
| WO | WO 2012/112157 A1 | 8/2012 |

OTHER PUBLICATIONS

International Search Report and Written Opinion for Application Serial No. PCT/US2011/025279 dated Nov. 11, 2011.

* cited by examiner

*Primary Examiner* — Donnie Crosland
(74) *Attorney, Agent, or Firm* — Jenkins, Wilson, Taylor & Hunt, P.A.

(57) ABSTRACT

Systems and methods for monitoring tires of a vehicle are provided. The systems can include a sensing device adapted to engage a tire of a vehicle and sense properties of a tire such as pressure and/or temperature. The sensing devices can be adapted to transmit sensed data to a system receiver adapted to provide the data to a user. The systems and methods can provide a user the desired information pertaining to one or more tires of a vehicle that are to be monitored, and the respective locations of the tires. The systems and methods can be adapted to monitor tires on any vehicle with inflatable tires, including off-the-road (OTR) vehicles.

27 Claims, 11 Drawing Sheets

TIRE MONITORING SYSTEMS AND METHODS

TECHNICAL FIELD

This presently disclosed subject matter relates to monitoring tires in wheeled vehicles. More specifically, the presently disclosed subject matter is directed to tire monitoring systems and methods for monitoring properties of tires, such as pressure and/or temperature, of a vehicle and for indicating to a user or vehicle operator the tire properties of each tire being monitored.

BACKGROUND

Many types of vehicles, including passenger vehicles and automobiles, commercial vehicles, as well as off-the-road (OTR) vehicles such as loaders, backhoes, graders, trenchers, mining vehicles, construction vehicles, and agricultural vehicles, often use pressurized rubber tires or pneumatic tires. Certain properties of tires in use on a vehicle, such as internal air pressure and temperature, can impact the performance and safety of the vehicle. As such, a need exists for systems and methods for monitoring tires on vehicles. A need exists for tire monitoring systems and methods that provides a user or vehicle operator with the desired tire properties being monitored, as well as the location of the tire. Moreover, a need exists for systems and methods for monitoring tires in OTR vehicles and the like.

SUMMARY

It is an object of the presently disclosed subject matter to provide novel tire pressure monitoring systems and methods.

An object of the presently disclosed subject matter having been stated hereinabove, and which is achieved in whole or in part by the presently disclosed subject matter, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The subject matter disclosed herein provides tire monitoring systems and methods for vehicles. In some aspects or embodiments, the tire monitoring systems and methods provide a user, such as an operator of a vehicle, with the ability to monitor the temperature, pressure, and any other suitable property or parameter of a tire. In some aspects, the property or parameter to be monitored is that of the interior of the tire. In some aspects, the tire monitoring systems and methods can indicate to an operator the monitored properties specific to each tire of the vehicle, and the corresponding location of each tire from which the property is monitored. In some aspects, the tire monitoring systems monitor the tire pressure and/or temperature in one or more tires of a vehicle and indicates to the vehicle operator the tire pressure and/or temperature of each tire being monitored.

The presently disclosed subject matter provides tire monitoring systems and methods for monitoring tires in any type of vehicle that uses pressurized and/or pneumatic tires, as would be appreciated by one of ordinary skill in the art. Many types of vehicles, including passenger vehicles and automobiles, commercial vehicles, as well as off-the-road (OTR) vehicles such as loaders, backhoes, graders, trenchers, mining vehicles, construction vehicles, and agricultural vehicles, often use pressurized tires or pneumatic tires. Certain properties of tires in use on a vehicle, such as internal air pressure and temperature, can impact the performance and safety of the vehicle. As such, systems and methods for monitoring tires are needed.

Figure 1:
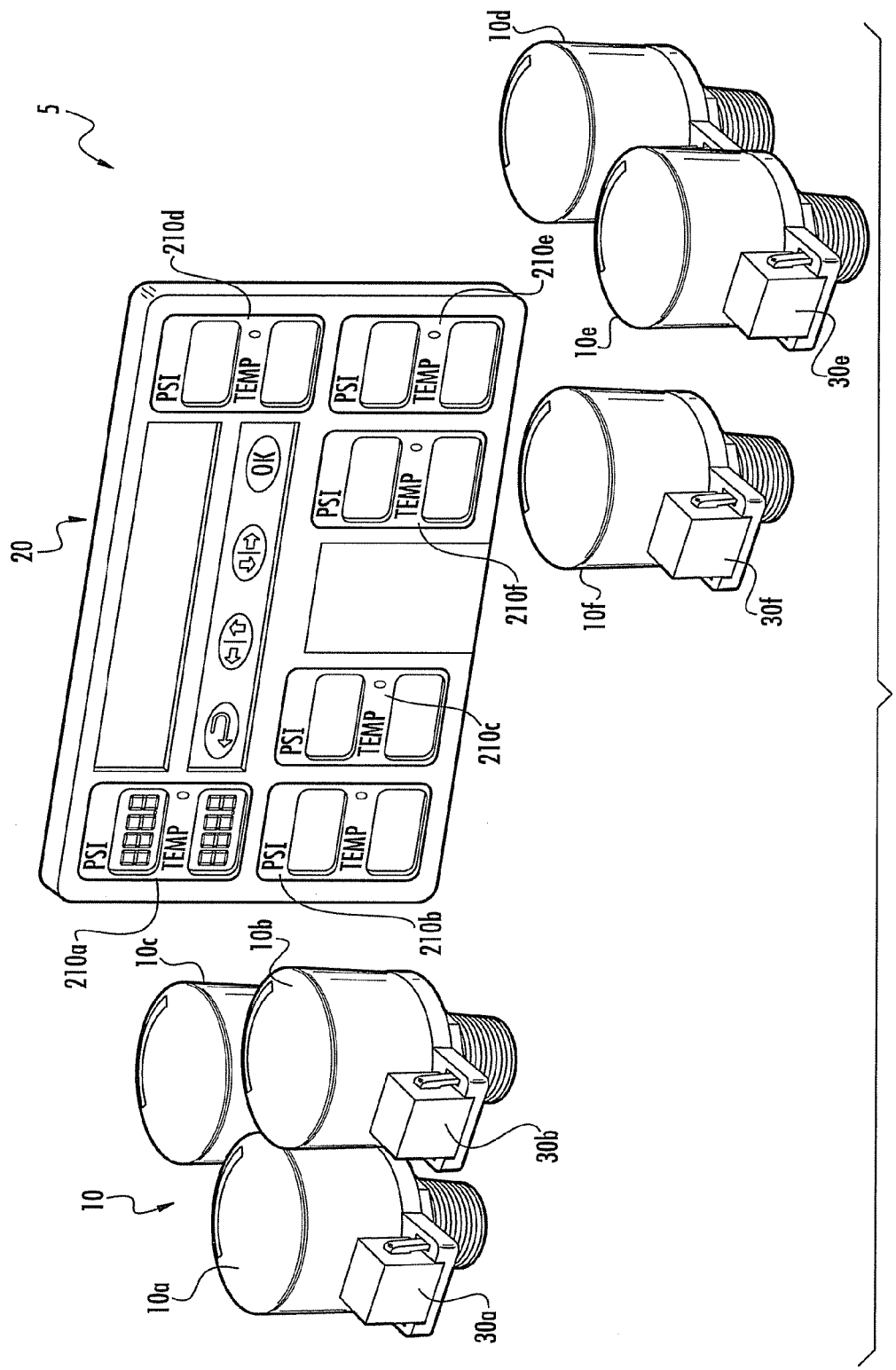
FIG. 1 is a perspective view of one aspect of a system according to the subject matter herein with a plurality of sensing devices and a system receiver.

Referring to FIG. 1, the tire monitoring systems and methods of the presently disclosed subject matter can comprise one or more sensing devices 10 and a system receiver 20. The sensing devices 10 can collect sensed data from a vehicle tire and transmit the data to the system receiver 20 to be processed and displayed to a user, such as a vehicle operator. In some embodiments, a tire monitoring system of the presently disclosed subject matter can comprise a sensing device 10 for each tire of the vehicle and a system receiver 20 to receive, process and display to a user the sensed data from each tire of the vehicle. By way of example and not limitation, six sensing devices 10 and one system receiver 20 are shown in FIG. 1. However, any number of sensing devices 10, and system receivers 20, can be used in a vehicle for which the tires are to be monitored without departing from the scope of the presently disclosed subject matter. In some aspects the sensed data for a tire being displayed or provided to a user can further comprise the location of the tire on the vehicle.

Figure 2:
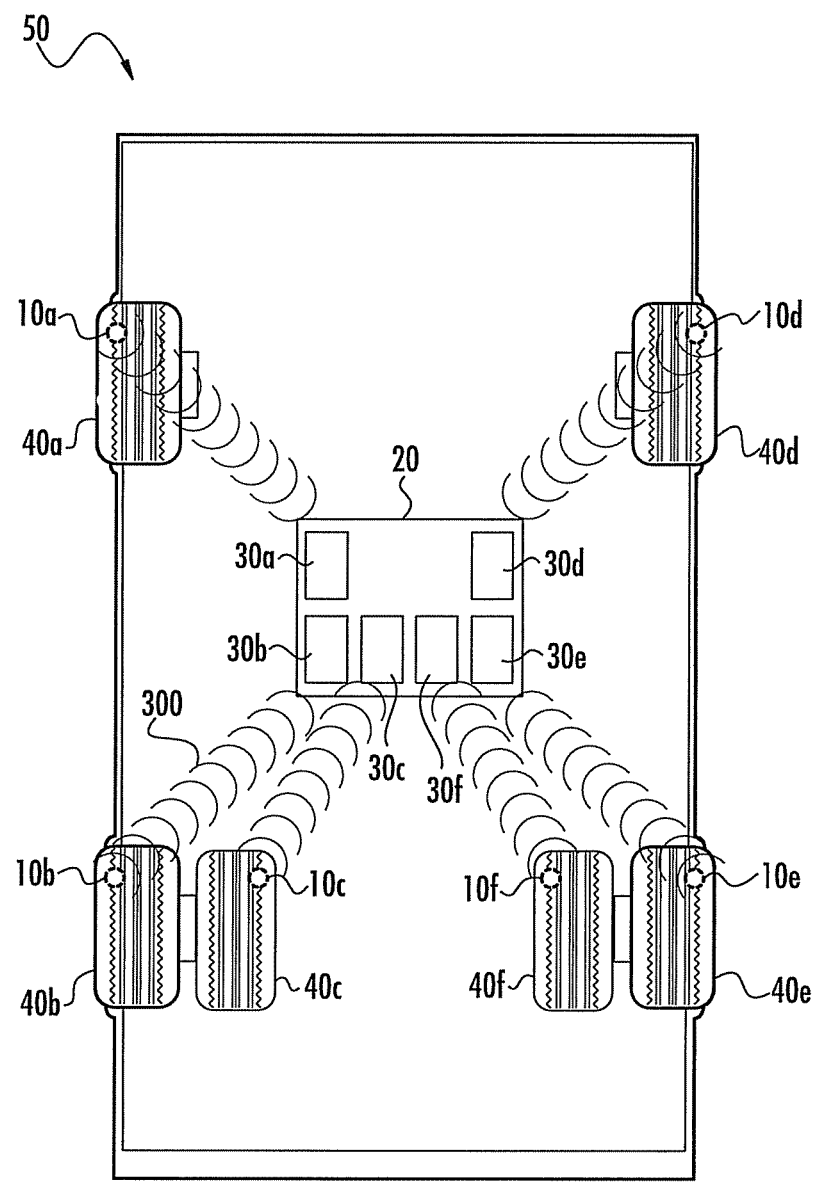
FIG. 2 is a schematic illustration of a tire monitoring system and method of the subject matter herein installed on a vehicle.
Figure 3:
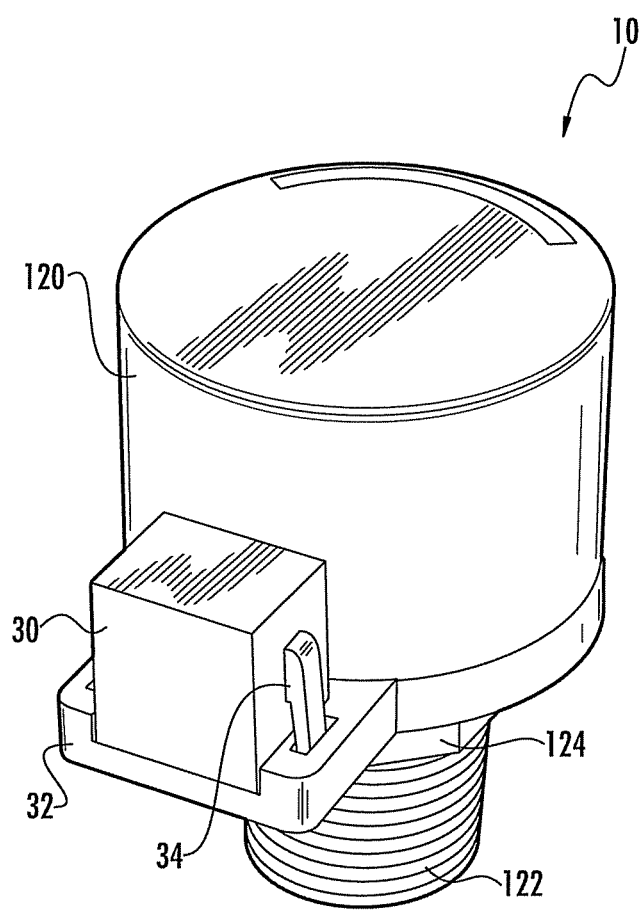
FIG. 3 is a perspective view of a sensing device according to one aspect of the subject matter herein.

By way of example, FIG. 1 of the drawings illustrates one possible tire pressure monitoring system, generally designated 5, according to the subject matter herein. FIG. 2 shows a tire monitoring system of the subject matter herein installed on a vehicle generally designated 50. The tire monitoring system can comprise at least one sensing device 10 and at least one system receiver 20. A system receiver 20 can receive sensed data in the form of a signal 300 from each tire 40 having an installed sensing device 10, wherein the signal can comprise sensed data and the corresponding location of the tire 40. System receiver 20 can process received data and convey it to a user. By way of example and not limitation, in FIG. 2 a sensing device 10 is installed on the wheel of each of the six tires 40 of vehicle 50. Tire monitoring system 5 can be installed on any suitable vehicle comprising inflatable or pneumatic tires 40, wherein the vehicle, such as vehicle 50 in FIG. 2, can comprise any number of tires 40. Moreover, the tire monitoring system of the subject matter herein can be installed on a plurality of tires 40 of a vehicle 50, depending on the tires desired to be monitored, but need not be installed on every tire of a vehicle.

Referring to FIGS. 3, 4 and 5A-5C, sensing device 10 is shown. In some aspects, sensing device 10 can comprise a housing 120 and an engaging member 122. Housing 120 can protect the internal components of the sensing device 10 and reduce the likelihood of contaminants impairing the operation of sensing device 10. Engaging member 122 can comprise a threaded tubular or hollow cylindrical structure or fastener extending perpendicular from the base of sensing device 10. Engaging member 122 can engage an opening of a wheel of a vehicle tire. In some aspects, engaging member 122 can comprise a screen or filter component (not shown) disposed over the end of the threaded tubular or hollow cylindrical structure to prevent debris from entering sensing device 10.

Figure 4:
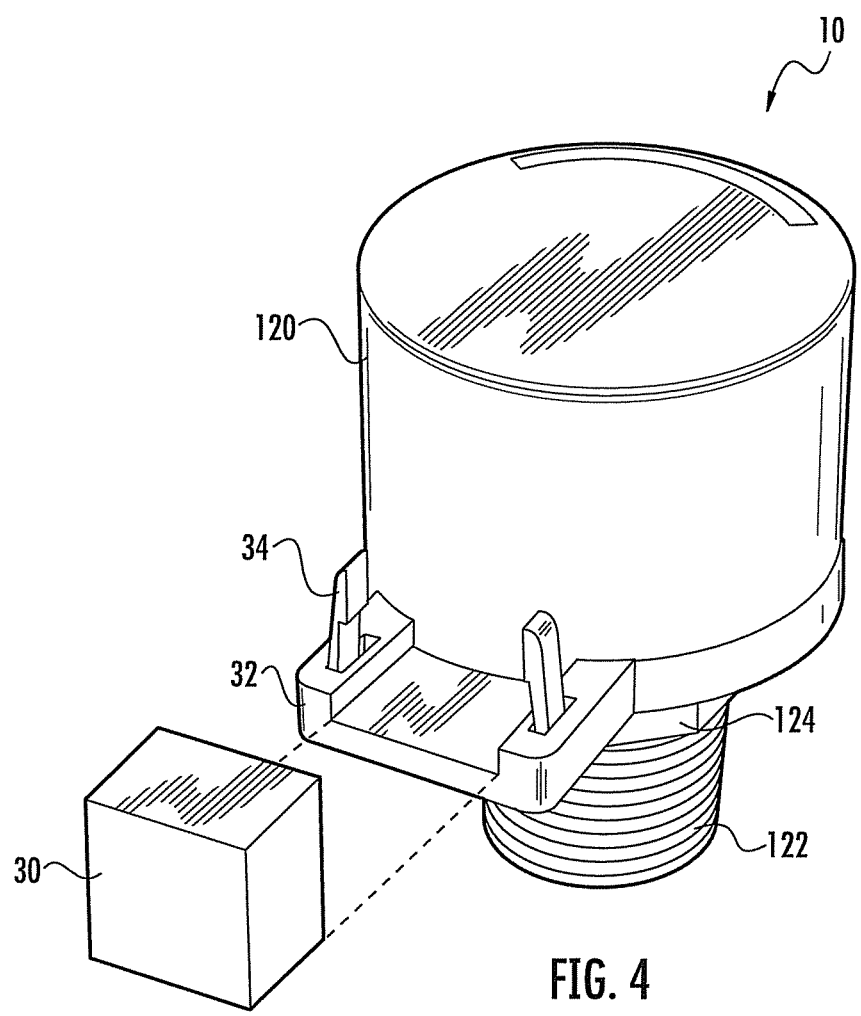
FIG. 4 is a perspective view of a sensing device of the subject matter herein illustrating removability of the identification component.
Figure 5A:
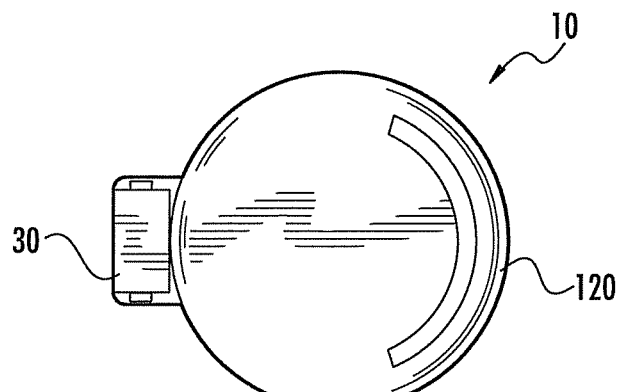
FIGS. 5A, 5B and 5C are top, side and bottom views, respectively, of a sensing device of the subject matter herein.
Figure 5B:
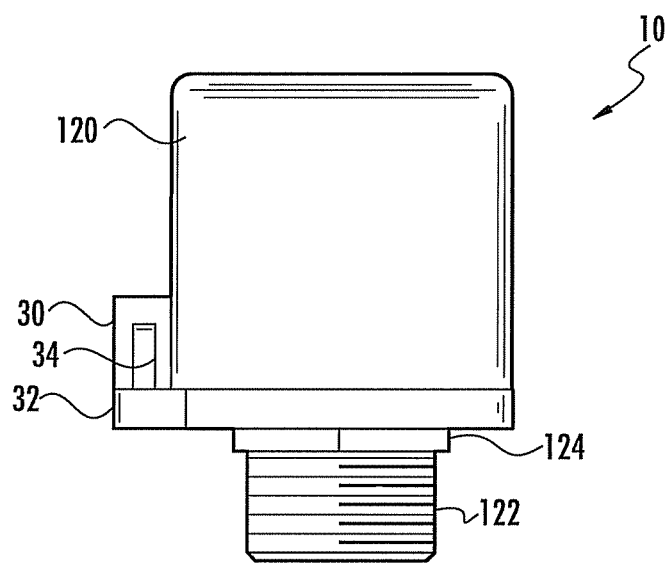
Figure 5C:
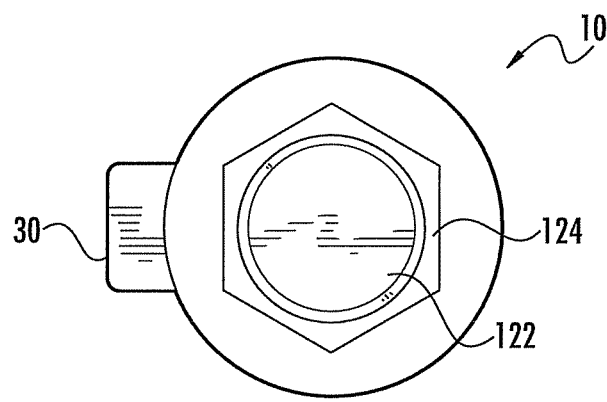

In some aspects, sensing device 10 can further comprise a removable identification component 30. Sensing device 10 can comprise an attachment point 32, and in some embodiments a securing mechanism 34, e.g. a clip, for holding and securing the identification component 30 to its matched sensing device 10 when the identification component 30 and/or sensing device 10 is not in use. As illustrated in FIG. 4, identification component 30 can be removed from the attachment point 32 of sensing device 10. In some embodiments, the securing mechanism 34 can be manipulated by a user to release the identification component 30 from the attachment point 32.

Figure 6A:
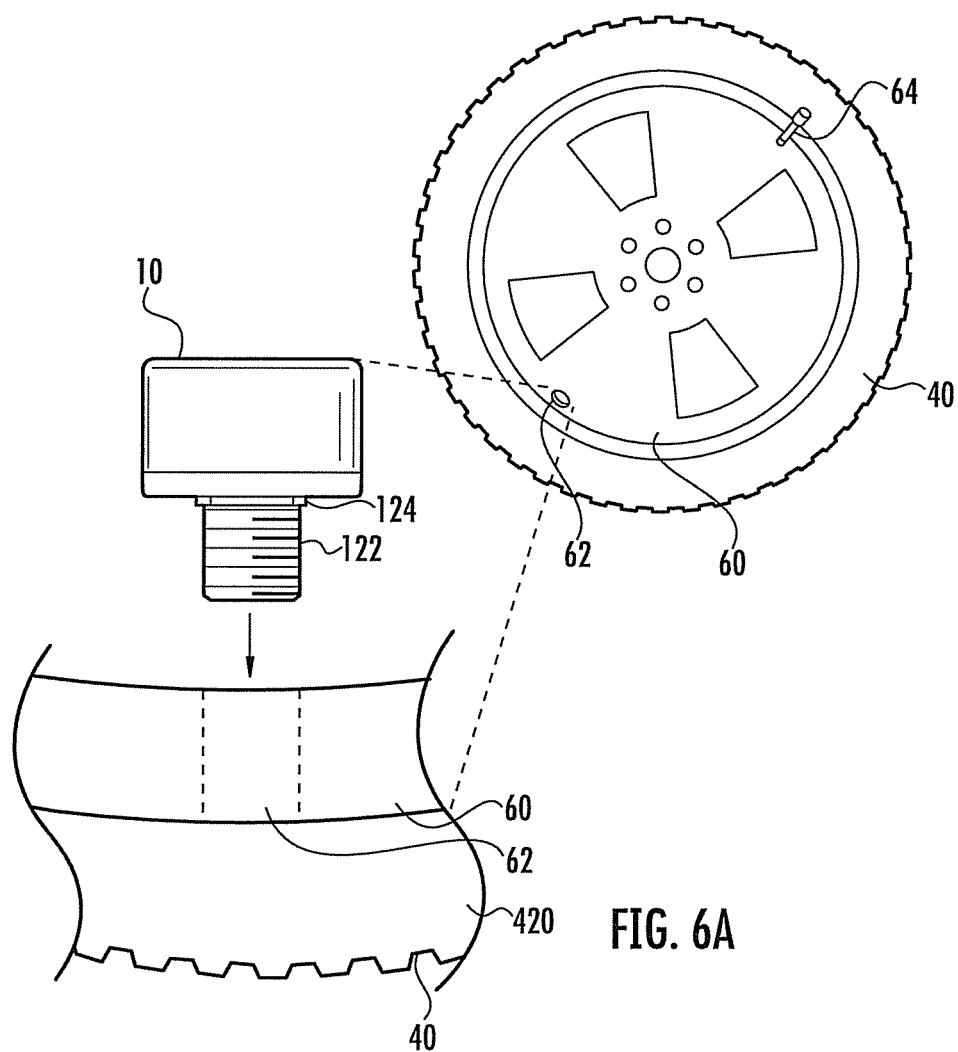
FIG. 6A is a magnified view of a cross section of an opening in a wheel of a vehicle where a sensing device of the subject matter herein can be engaged.
Figure 6B:
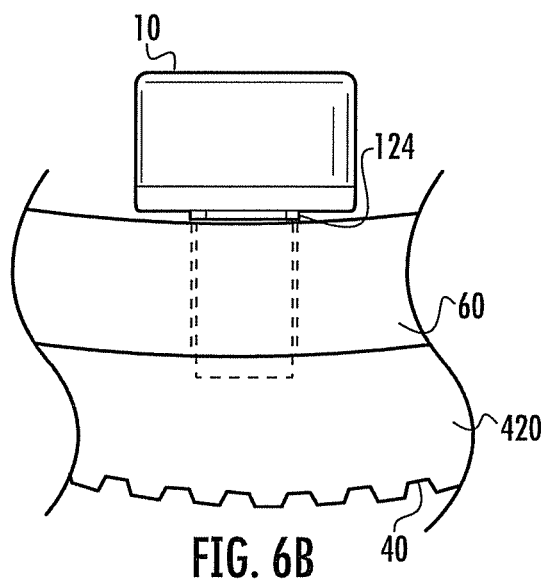
FIG. 6B illustrates a sensing device of the subject matter herein engaged with the opening of a wheel.

As illustrated in FIGS. 6A and 6B, engaging member 122 can engage an opening 62 of a wheel 60 of a vehicle. In some embodiments, engaging member 122 can further comprise a nut such as nut 124 that when tightened exerts a clamping force against wheel 60 to help secure sensing device 10 to opening 62 of wheel 60. In some aspects, nut 124 can allow for the use of a wrench (not shown) to tighten engaging member 122 securely against wheel 60.

As illustrated in FIG. 6B, engaging wheel 60 by inserting engaging member 122 of sensing device 10 into opening 62 of wheel 60 can expose engaging member 122 to the interior 420 of tire 40 mounted to wheel 60. Sensing device 10 can engage an existing opening of wheel 60 or an opening created by a user, as discussed further hereinbelow. Unlike existing tire pressure sensors, the sensing device 10 of the presently disclosed tire monitoring systems and methods is not mounted within the air valve stem or associated with the air valve stem 64 (FIG. 6A) of the tire-wheel assembly. Rather, the sensing device 10 of the presently disclosed subject matter is disassociated with the air valve stem 64, and in some embodiments, is located approximately 180 degrees radially from the air valve stem 64 on the wheel 60. In some embodiments, a sensing device 10 of the presently disclosed subject matter engages a bore hole in the wheel 60 that is disassociated from the air valve stem 64. In some embodiments, the bore hole can be pre-existing on a wheel 60. Alternatively, in some embodiments, the bore hole can be drilled into the wheel 60 to allow the sensing device 10 to engage the wheel 60. Once engaged to the wheel 60 the sensing device 10 can collect data, e.g. pressure and/or temperature data, from the interior 420 of the tire 40.

Figure 7:
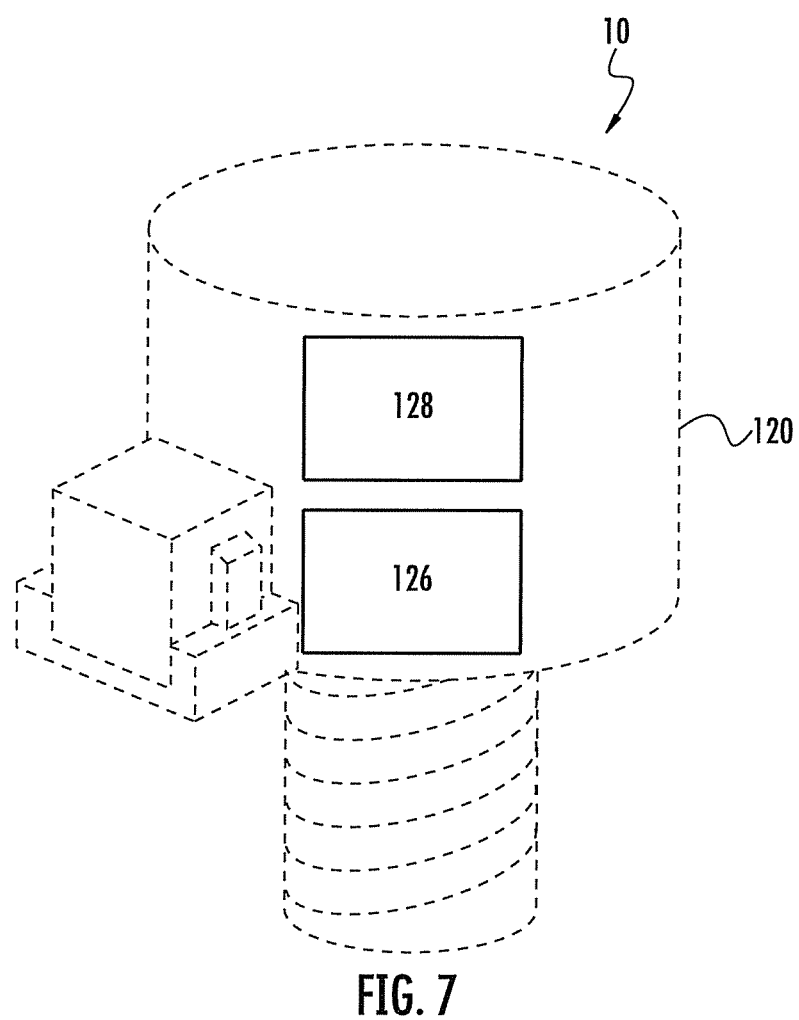
FIG. 7 is an internal view of components of a sensing device of the subject matter herein.

On the interior of the housing 120 of the sensing device 10, as best seen in FIG. 7, the sensing device 10 can comprise a sensor 126 adapted for collecting sensed data from a vehicle tire, and a transmitting device 128 adapted for transmitting the sensed data. In some embodiments, the sensing device 10 can further comprise an independent power supply (not shown) so as to be totally self-contained and eliminate the need for any power cabling or coaxial cables. In some embodiments, the power supply can be a long life battery and/or a low voltage battery. In some embodiments, the sensing device 10 can further comprise a microprocessor (not shown) for processing the collected data and/or preparing the data for transmission. In some embodiments, a microprocessor of the sensing device 10 can comprise a conventional microprocessor that includes read-only memory (ROM), random access memory (RAM) and a central processing unit (CPU).

In some embodiments, a sensing device 10 of the subject matter herein can comprise a unique identification number or digital code. In some embodiments, the unique identification number can be stored in the ROM of the microprocessor of the sensing device 10. The unique identification number or digital code can be transmitted along with the sensed data such that the data received by the system receiver 20 can be identified with the sensing device 10 from which it was sent. Where multiple sensing devices are used simultaneously on a single vehicle, each sensing device 10 can comprise a unique identification number. In some aspects, a removable identification component 30 that is electronically associated with and identified to a sensing device 10 can comprise the same unique identification number as sensing device 10.

A sensor 126 can comprise a pressure sensor adapted for collecting tire air pressure data. In some aspects, sensor 126 can sense the internal air pressure of a tire 40. In some aspects, the tire pressure is expressed as pound-force per square inch (PSI), kiloPascals (kPa), bar, Technical atmosphere (at), Atmosphere (atm), Torr, in Hg, mm of Hg, in $H_2O$, and/or dynes/$cm^2$. In some aspects, sensor 126 can comprise a temperature sensor adapted for collecting tire temperature data. In some aspects, sensor 126 can sense the temperature of the interior of a tire 40. In some embodiments, the tire temperature is expressed as degrees Fahrenheit (° F.), degrees Celsius (° C.), Rankine)(R°, and/or units Kelvin (K). In some aspects, sensor 126 can comprise a pressure sensor adapted for collecting tire pressure data and a temperature sensor adapted for collecting tire temperature data. Sensor 126 can comprise a sensor adapted for collecting any other parameter or property of a tire that is intended to be monitored without departing from the scope of the presently disclosed subject matter.

In some aspects, sensor 126 can be operatively linked to the interior or hollow portion of engaging member 122 of sensing device 10 such that sensor 126 is exposed to the interior 420 of tire 40 when sensing device 10 is engaged to opening 62 of wheel 60. In some aspects, sensor 126 is adapted or positioned to be acted upon by the properties, e.g. pressure or temperature, of interior 420 of tire 40 when sensing device 10 is engaged to wheel 60 of tire 40.

Transmitting device 128 can be operatively linked to sensor 126 and adapted for transmitting the sensed data. In some aspects, transmitting device 128 can be adapted for transmitting the identification number or digital code of the sensing device 10. In some aspects, transmitting device 128 can be operatively linked to the ROM or similar digital storage apparatus where the identification number or digital code of sensing device 10 is stored. In some aspects, transmitting device 128 can be adapted for transmitting the sensed data and identification number or digital code of sensing device 10 together or simultaneously as a single data packet. In some aspects, transmitting device 128 can be adapted for transmitting data in real-time. In some aspects, transmitting device 128 can transmit the data using a radio frequency signal, inductive signal, ultrasonic signal, an infrared signal, or combinations thereof. Any other signal type or means of transmission can be used without departing from the scope of the subject matter herein.

Figure 8B:
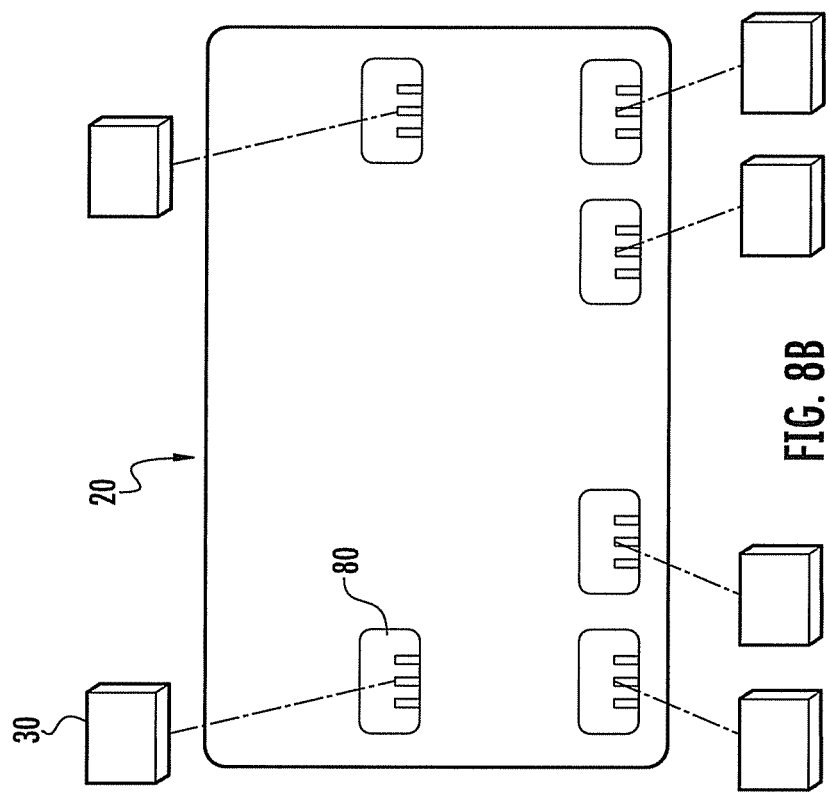
FIGS. 8A and 8B are front and rear views, respectively, of a system receiver according to an aspect of the subject matter herein.
Figure 8A:
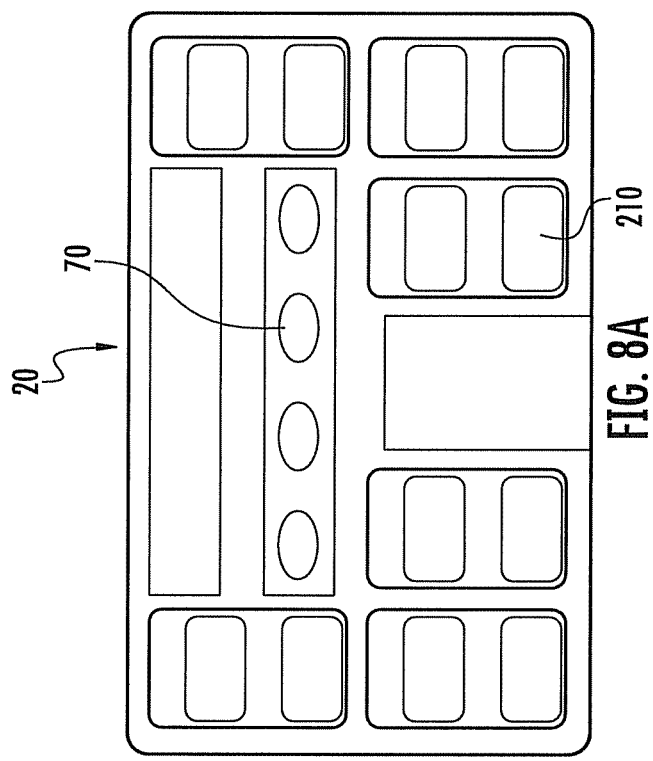
Figure 9A:
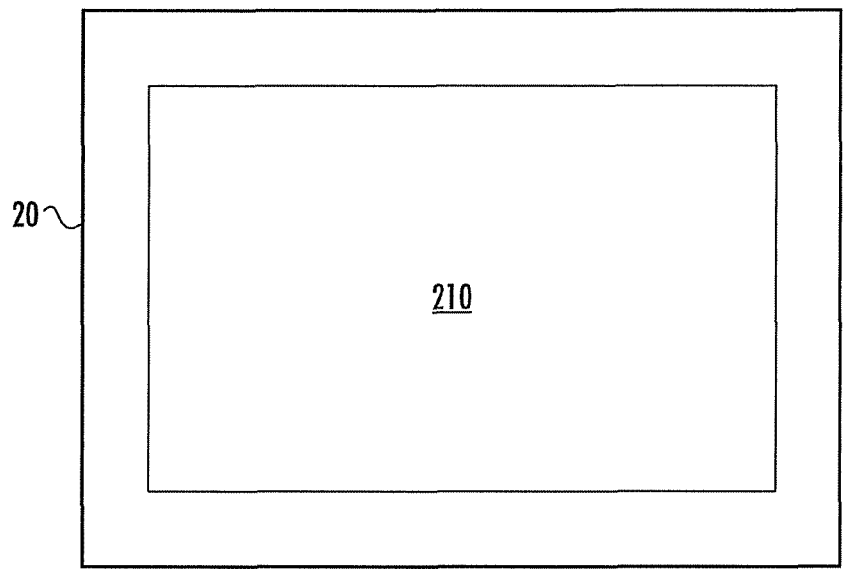
FIGS. 9A and 9B are front and perspective views, respectively, of a system receiver according to one aspect of the subject matter herein.
Figure 9B:
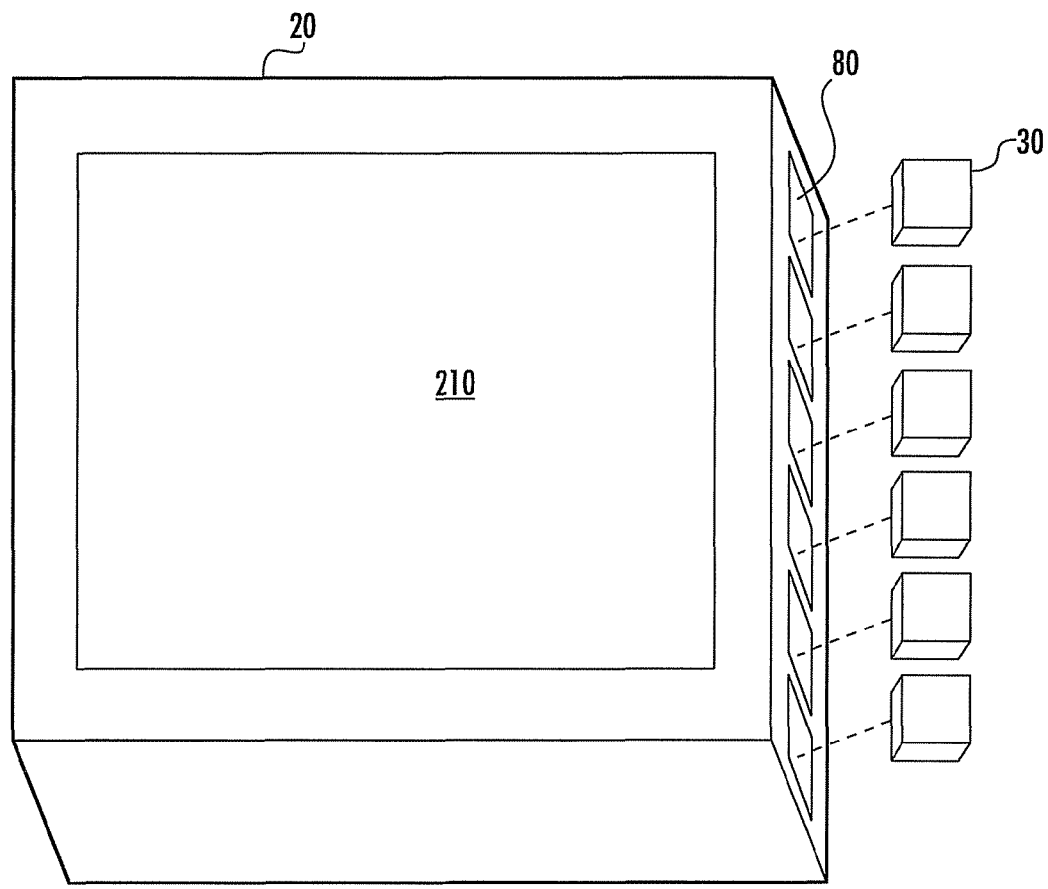

Front and rear views of an exemplary system receiver 20 are shown in FIGS. 8A and 8B, respectively. Likewise, front and rear views of an alternative exemplary system receiver 20 are shown in FIGS. 9A and 9B, respectively. System receiver 20 can receive data from a sensor and provide the data to a user, such as a vehicle operator. In some aspects, a system receiver 20 can comprise a display 210 for displaying data to an operator. In some embodiments, a system receiver 20 can comprise multiple displays 210a, 210b, 210c, 210d, 210e, 210f, as illustrated in FIG. 8A. In some embodiments, system receiver 20 having multiple displays 210 can be configured such that each individual display corresponds to a specific tire and/or tire location. In some embodiments, the correlation between a particular display 210 and a tire location can be predetermined, or in some embodiments can be programmable by a user.

In some embodiments, a system receiver 20 can comprise a single display as illustrated in FIG. 9A. In some aspects, system receiver 20 can comprise a single display 210 that displays data from multiple inputs, such as data received from a plurality of sensing devices 10. In some aspects, system receiver 20 can comprise a single display 210 that is a touch-screen display, whereby the touch-screen can facilitate user interaction with and operation of the system receiver 20. In some aspects, a system receiver 20 can comprise buttons 70, controls, keys, a key pad, or the like, such as illustrated in FIG. 8A, to facilitate user interaction with and operation of system receiver 20.

Continuing with FIGS. 8B and 9B, in some aspects system receiver 20 can comprise one or more ports 80 for receiving one or more identification components 30. Ports 80 can receive identification components 30 such that identification components 30 are operatively connected system receiver 20 whereby system receiver 20 can access information, e.g. identification number, stored on the identification component 30. System receiver 20 can comprise a plurality of ports 80, and in some embodiments as many or more ports 80 as tires on a vehicle that are to be monitored. In some aspects, system receiver 20 of a tire monitoring system of the presently disclosed subject matter can comprise 1, 2, 3, 4, 5, 6, 7, 8, 9, 10, 11, 12, 13, 14, 15, 16, 17, 18, 19, 20 or more ports 80. By way of example and not limitation, the system receivers 20 illustrated in FIGS. 8B and 9B comprise six ports 80 each. By way of example and not limitation, ports 80 can be in the back of system receiver 20, as illustrated in FIG. 8B. Alternatively, by way of example and not limitation, ports 80 can be on one or more of the sides of system receiver 20, as illustrated in FIG. 9B. Still yet, ports 80 can be located anywhere on system receiver 20 so long as each port 80 can receive an identification component 30. In some aspects, ports 80 can be located on system receiver 20 at a location convenient to a user.

In some embodiments, system receiver 20 can comprise an identification component module 90, wherein identification component module 90 can comprise one or more ports 80 for receiving one or more identification components 30. Identification component module 90 can comprise a plurality of ports 80, and in some embodiments as many or more ports 80 as tires on a vehicle that are to be monitored. In some embodiments, identification component module 90 can comprise 1, 2, 3, 4, 5, 6, 7, 8, 9, 10, 11, 12, 13, 14, 15, 16, 17, 18, 19, 20 or more ports 80. By way of example and not limitation, identification component module 90 illustrated in FIGS. 10A and 10B comprises six ports 80.

In some aspects, identification component module 90 is attached or affixed to the system receiver 20. By way of example and not limitation, identification component module 90 can be attached to the back of system receiver 20 in FIGS. 10A and 10B. In some aspects, identification component module 90 can be removable from system receiver 20. In some aspects, identification component module 90 can further comprise a removable cover 92. Removable cover 92 can slidingly engage identification component module 90 and serve as a protective cover for identification components 30 and ports 80. A user can remove removable cover 92 to provide access to ports 80 and identification component(s) 30 of the identification component module 90 such that the user can add, replace, and/or remove one or more identification components 30.

Figure 11:
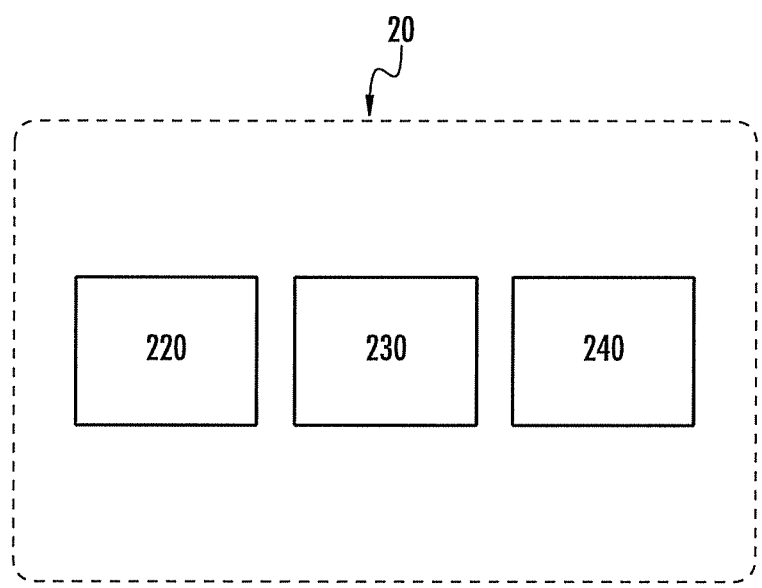
FIG. 11 is an internal view of components of a system receiver according to one aspect of the subject matter herein.

In some embodiments, and as illustrated in FIG. 11, a system receiver 20 can comprise a receiving component 220 that can receive data transmitted from a sensing device 10. In some aspects, receiving component 220 can receive a signal transmitted by a transmitting device 128 of a sensing device 10. In some embodiments, receiving component 220 can comprise an antenna. By way of example and not limitation, a receiving component 220 can receive a radio frequency signal, inductive signal, ultrasonic signal, an infrared signal, combinations thereof, or any other signal type or means of transmission.

In some aspects, and as illustrated in FIG. 11, a system receiver 20 can comprise a processor 230 for processing data received from a sensing device 10. In some aspects, processor 230 can comprise a conventional microprocessor comprising random access memory (RAM), read only memory (ROM), and a central processing unit (CPU). In some aspects, processor 230 can process sensed data and provide the data, e.g. tire pressure, temperature, and/or location, to a display 210. In some aspects, the processor 230 is operatively linked to the receiving component 220, such that data received by receiving component 220 from a sensing device 10 can be processed by processor 230. In some aspects, processor 230 is operatively linked to a display 210.

In some aspects, system receiver 20 can receive data from sensing device 10 in real-time. In some aspects, transmitting device 128 of sensing device 10 and a system receiver 20 can transmit and receive, respectively, data sensed by sensing device 10 in real-time such that the data is provided to a user in real-time.

In some aspects, system receiver 20 can store received data in timeline increments, e.g. every 5, 10, 20, 30, 60, or 120 minutes. In some aspects, processor 230 of a system receiver 20 can time stamp and store increments of data received from one or more sensing devices 10 in a downloadable format. In some aspects, processor 230 can time stamp and store increments of data more closely together where sudden changes in tire properties, e.g. temperature or pressure, are sensed. In some aspects, system receiver 20 can indicate to a user the sensed data from a tire 50 and the location of the tire 50 when the tire pressure and/or temperature exceeds a predetermined maximum threshold or falls below a predetermined minimum threshold. In some aspects, predetermined maximum and/or minimum thresholds can be determined by a user and programmed into the system receiver 20. In some aspects, system receiver 20 can further comprise an alarm for alerting a user.

Figure 10A:
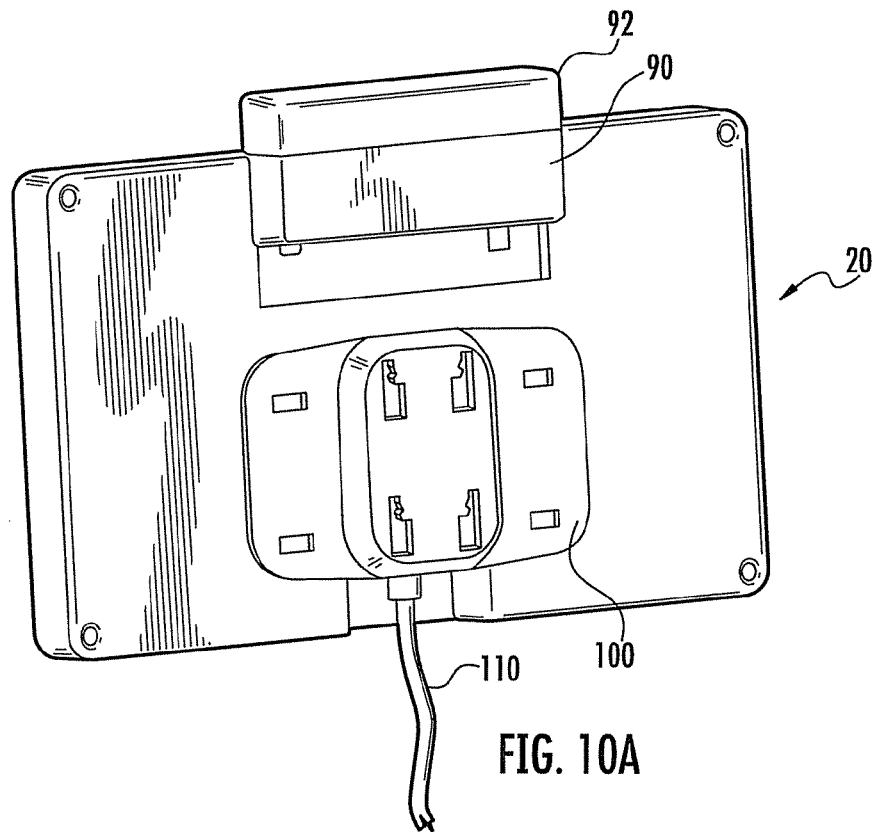
FIGS. 10A and 10B are rear views of a system receiver with an identification component module according to one aspect of the subject matter herein.
Figure 10B:
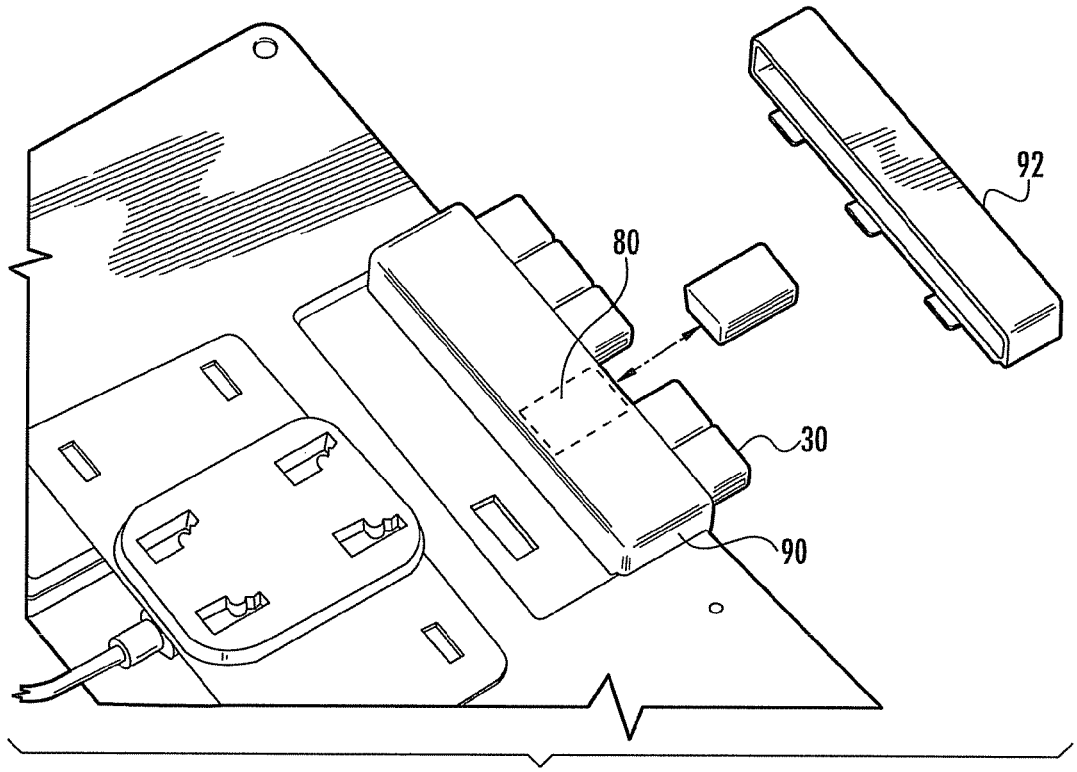

In some aspects, system receiver 20 can further comprise a power supply 240, as illustrated in FIG. 11. In some aspects, power supply 240 can comprise an independent power supply so as to be totally self-contained and eliminate the need for any power cabling or coaxial cables. In some aspects, the power supply can be a long life battery and/or a low voltage battery. Alternatively, system receiver 20 can be powered directly by the vehicle to which system receiver 20 is installed for monitoring the tires. For example, system receiver 20 can be operatively linked to the electronic system of a vehicle via a power cord 110, as illustrated in FIG. 10A.

In some aspects, a receiving component 220 and processor 230, and independent power supply, if present, can be on the interior of system receiver 20, as best illustrated in FIG. 11, for ease of mounting and to reduce the likelihood of contaminants impairing the operation of receiving component 220, processor 230, and system receiver 20.

In some aspects, system receiver 20 can further comprise a mounting bracket 100. In some aspects, a mounting brace (not shown) capable of engaging mounting bracket 100 and affixing to a operating surface of a vehicle (e.g. a dashboard or control deck) can be provided. Mounting bracket 100 on system receiver 20, and a mounting brace where provided, can provide a user with the ability to install, mount or place system receiver 20 at a location on or near vehicle 50 that is convenient to a user for purposes of viewing and operating system receiver 20.

In operation, sensing device 10 can collect data from tire 40 to which sensing device 10 is mounted. Transmitting device 128 can then transmit the data to a system receiver 20. The data can then be provided to a user, in some aspects via a display 210.

To elaborate further, a user can install a tire monitoring system according to the subject matter herein on a vehicle 50 to provide a means of monitoring tires 40 of vehicle 50. A user can install sensing device 10 on each tire 40 of vehicle 50 that is desired to be monitored. In some aspects, a user can install sensing device 10 on each tire 40 of vehicle 50. In some aspects, a user can install sensing device 10 on less than all of tires 40 of vehicle 50, and particularly only those tires that are desired to be monitored. In some aspects, a tire monitoring system of the subject matter herein can be installed on vehicle 50 to monitor 1, 2, 3, 4, 5, 6, 7, 8, 9, 10, 11, 12, 13, 14, 15, 16, 17, 18, 19, 20 or more tires 40 of vehicle 50.

Sensing device 10 can be installed on tire 40 of a vehicle by engaging an opening 62 of a wheel 60 of a vehicle tire 40 by inserting engaging member 122 of sensing device 10 into opening 62 of wheel 60, as illustrated in FIGS. 6A and 6B. Opening 62 of wheel 60 can comprise an opening 62 already existing on wheel 60. For example, some vehicles 50, particularly OTR vehicles, comprise a wheel such as wheel 60 wherein each has an existing bore hole enclosed with a plug. In some aspects, such pre-existing bore holes can be disassociated from air valve stem 64. That is, a bore hole can be at a location on a wheel that is separate and apart from the air valve stem. In some aspects, a pre-existing bore hole can be located approximately 180 degrees radially from air valve stem 164 on wheel 60. Where such pre-existing bore holes are present, a user can install sensing device 10 into the pre-existing bore hole. In some aspects, sensing device 10 can be of a size suitable for a pre-existing bore hole. By way of example and not limitation, the size of the pre-existing bore hole can be ½-14 NPT, ¼-14 NPT or 1 1/16-12 NPT, or any similar size as would be known to those of ordinary skill in the art. In some aspects, a pre-existing bore hole can receive a sensing device 10 either directly or such as by drilling out the bore hole to enlarge the circumference of the opening to receive the sensing device 10. In some aspects, a pre-existing bore hole can have a threaded receiving member wherein sensing device 10 can be threaded into the pre-existing bore hole using threaded engaging member 122.

Alternatively, where no pre-existing bore hole is present on a wheel of a vehicle having tires that are to be monitored, a user can drill a hole into the wheel 60 or otherwise create an opening such as opening 62 in the wheel sufficient to receive sensing device 10. In order to receive sensing device 10, an opening 62 of a wheel 60 should be of a circumference sufficient to receive the engaging member 122 of the sensing device 10. As would be appreciated by one of ordinary skill in the art, a drill bit or boring device can be selected to create an opening on a wheel that is appropriately sized to receive the engaging member 122 of the sensing device 10.

Once a pre-existing bore hole is identified, or opening 62 on wheel 60 is created, engaging member 122 of sensing device 10 can be inserted into opening 62. In some aspects, engaging member 122 can comprise threads to secure sensing device 10 into opening 62 of wheel 60. In some aspects, engaging member 122 can further comprise a nut 124, that when tightened exerts a clamping force against the wheel 60 to help secure sensing device 10 to opening 62 of wheel 60. In some aspects, nut 124 allows for the use of a wrench to tighten engaging member 122 securely against wheel 60. In some aspects, a washer and/or 0-ring can also be used to securely engage sensing device 10 to opening 62 of wheel 60, and/or create an air-tight seal. In some aspects, a sealing material can be applied to the threads of engaging member 122 of sensing device 10 to provide an air-tight and/or liquid-tight seal when sensing device 10 is securely installed to the wheel.

When properly engaged to opening 62 of wheel 60, sensing device 10 can be exposed to interior 420 of a tire 40 mounted to a wheel 60, such that sensing device 10 can collect data, e.g. pressure, temperature, and/or other properties, from interior 420 of tire 40. Engaging member 122 can comprise a threaded tubular or hollow cylindrical structure or fastener extending perpendicular from the base of sensing device 10, such that the tire pressure and/or temperature, or other property being monitored, on interior 420 of tire 40 can act upon sensor 126 of sensing device 10.

Once sensing device 10 is installed on wheel 60 of tire 40 to be monitored, or a plurality of tires 40 to be monitored, data sensed by sensor 126 can be transmitted to system receiver 20 by transmitting device 128 of sensing device 10. System receiver 20 can be installed, mounted or placed at a location on or near the vehicle that is convenient to a user for purposes of viewing and operating system receiver 20. By way of example and not limitation, system receiver 20 can be mounted in the cab of a vehicle such that a user, or vehicle operator, can observe data displayed on system receiver 20 while operating the vehicle.

System receiver 20 installed on a vehicle where sensing device 10 is installed on one or more tires can receive data transmitted by each sensing device 10. This data can be displayed to a user via one or more displays 210 on system receiver 20. Where multiple tires are being monitored on a vehicle, the tire monitoring system can also indicate to a user the location of each tire 40 on the vehicle along with the data sensed from each tire 40. To provide a user with location specific data for tires 40 that are being monitored, sensing device 10 can further comprise a unique identification number or digital code. In some aspects, the unique identification number can be stored in the ROM of the microprocessor of sensing device 10. Where multiple sensing devices are used simultaneously on a single vehicle, each sensing device 10 can comprise a unique identification number. In use, data transmitted from a sensing device 10 to system receiver 20 can comprise the unique identification number or digital code of sensing device 10. As such, system receiver 20 can receive multiple data signals 300 from multiple sensing devices 10, wherein each data signal 300 can be accompanied by the unique identification number or digital code of the sensing device 10 from which the data was transmitted.

Upon installing one or more sensing devices 10, a user can remove removable identification component 30 that is electronically associated with and identified to sensing device 10, and the user can engage identification component 30 with a port 80 of the system receiver 20. Because identification component 30 comprises the same unique identification number or digital code as the sensing device 10 that it is associated with and removed from, any data received from that sensing device 10 and received by system receiver 20 will be associated with that identification component 30. By way of example and not limitation, in FIGS. 1 and 2, sensing device 10a has an identification component 30a. Engaging identification component 30a into a port 80 of system receiver 20, as illustrated in FIGS. 8B and 9B, allows for data transmitted from sensing device 10a to system receiver 20 to be associated with or matched to identification component 30a. The same goes for sensing devices 10b, 10c, 10d, 10e, and 10f, and identification components 30b, 30c, 30d, 30e, and 30f, respectively. Thus, once a user has installed one or more sensing devices 10, the user can remove the removable identification components 30 that are electronically associated with and identified to the sensing devices 10, and engage identification components 30 with ports 80 of system receiver 20, such that system receiver 20 can correlate data received from each sensing device 10 to its corresponding identification component 30.

To match data sensed from a tire 40 to the location of the tire from which the data was obtained, ports 80 on system receiver 20 for receiving one or more identification components 30 can correspond to one or more tire 40 locations on vehicle 50. Further, in some aspects, a port 80 assigned to a specific tire location can also correspond to a display 120 assigned to the same tire location (e.g. displays 210a, 210b, 210c, 210d, 210e, 210f), such that data received by system receiver 20 and matched to an identification component 30 engaged to the port 80 will display the data in the display 120 that corresponds to the same tire location. As such, engaging a port 80 of system receiver 20 corresponding to a specific tire location with an identification component 30 corresponding to the same tire location of an engaged sensing device 10 with a unique identification number or digital code that matches the identification component 30 allows system receiver 120 to correlate data received from sensing device 10 to the tire location of sensing device 10 from which the data was transmitted. By way of example and not limitation, in FIGS. 1 and 2, sensing device 10a has an identification component 30a. Engaging identification component 30a into a port 80 of system receiver 20, as illustrated in FIGS. 8B and 9B, allows for data transmitted from sensing device 10a to system receiver 20 to be associated with or matched to identification component 30a. The same goes for sensing devices 10b, 10c, 10d, 10e, and 10f, and identification components 30b, 30c, 30d, 30e, and 30f, respectively.

Thus, once a user has installed one or more sensing devices 10, the user can remove the removable identification components 30 that are electronically associated with and identified to the sensing devices 10, and engage identification components 30 with ports 80 of system receiver 20, such that system receiver 20 can correlate data received from each sensing device 10 to its corresponding identification component 30.

Where each port 80 is assigned to a specific tire location, the user can remove identification component 30 from sensing device 10 installed on the tire in that location and engage identification component 30 with port 80. For example, referring to FIG. 2, if top left port 80 on system receiver 20 is assigned to front left tire 40a on a vehicle, a user could remove identification component 30a from sensing device 10a installed on front left tire 40a and engage identification component. 30a with top left port 80 on system receiver 20. Then, when data is transmitted from tire 40a via the transmitting device in sensing device 10a, the data received by system receiver 20 will be associated with identification component 30a since the identification number accompanying the data from sensing device 10a will match that of identification component 30a. Because the top left port on system receiver 20 is assigned to front left tire 40a, system receiver 20 will provide to a user the data from front left tire 40a as well as the location of the tire. Referring to FIG. 2 again as an example, the same can be done for each of tires 40b, 40c, 40d, 40e, and 40f; sensing devices 10b, 10c, 10d, 10e, and 10f; and identification components 30b, 30c, 30d, 30e, and 30f, respectively.

Ports 80 on a system receiver 20 can be assigned a tire location or can be programmable as needed by a user. In some embodiments, multiple displays 120, such as shown in FIGS. 1 and 2 (displays 120a, 120b, 120c, 120d, 120e, and 120f), can be oriented in a manner mimicking the location of the tires on vehicle 50. In some aspects, ports 80 can be oriented in a similar manner (see FIG. 8B). In some aspects, ports 80 can be assignable or programmable to be associated with a tire location as suitable to a user, and relay the information to a display 120 such that the data and the tire location are provided to a user (see FIGS. 9B, 10A and 10B).

In use, a tire monitoring system of the subject matter herein can allow for a user to change a tire 40, and/or a sensing device 10, or rotate the tires 40 on a vehicle 50, without having to reprogram the tire monitoring system. For example, if a user replaces tire 40a in FIG. 2, sensing device 10a can be removed from tire 40a and installed on the new tire. Data transmitted from sensing device 10a will be displayed as being from the new tire in the same position as was tire 40a. Alternatively, if a user replaces tire 40a in FIG. 2, and does not remove sensing device 10a from tire 40a, but instead installs a new sensing device 10 on the replacement tire 40, the identification component 30 from the new sensing device 10 can be engaged to the same port 80 as was the prior identification component 30 such that the system receiver 20 will not require reprogramming regarding tire locations. The same applies for tire rotations. For example, if each of the tires 40a, 40b, 40c, 40d, 40e, and 40f on vehicle 50 in FIG. 2 are rotated without uninstalling sensing devices 10a, 10b, 10c, 10d, 10e, and 10f, a user need only move identification components 30a, 30b, 30c, 30d, 30e, and 30f in a similar manner, such that the orientation of matching identification components 30 and sensing devices 10 is maintained.

In some aspects, data sensed by sensing device 10 can be collected by a user using a hand-held tool (e.g. a receiver) adapted for collecting the sensed data from one or more sensing devices 10 by holding the hand-held tool near a wheel of a vehicle having a sensing device 10 installed thereon. In some aspects, the hand-held tool can comprise a receiving component capable of receiving a data signal 300 transmitted by a sensing device 10, such that when the hand-held tool is in proximity to a sensing device 10 installed on a wheel of a vehicle, and in some aspects activated by a user by pressing a trigger button, the hand-held tool can receive and collect the data signal 300 transmitted by the sensing device 10.

As can be appreciated, the tire monitoring systems and methods of the presently disclosed subject matter can be utilized on any vehicle comprising inflatable or pneumatic tires. Such vehicles include but are not limited to passenger vehicles and automobiles, such as cars, light-duty trucks, passenger vans, and sport utility vehicles; commercial vehicles, such as tractor-trailer rigs, moving vans, and box trucks; recreational and all-terrain vehicles; military vehicles; agricultural vehicles and equipment, such as tractors, combines and tillage equipment; and off-the-road (OTR) vehicles such as loaders, backhoes, earth moving equipment, graders, dump trucks, trenchers, mining vehicles and equipment and construction vehicles. In some embodiments, tire monitoring systems and methods of the presently disclosed subject matter can be utilized on off-the-road (OTR) vehicles. In some embodiments, OTR vehicles comprise tires having a pre-existing bore hole sufficient for installing a sensing device 10, as described hereinabove.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A tire monitoring system for a vehicle, comprising:
at least one sensing device adapted for engaging an opening of a wheel of a vehicle such that the sensing device is exposed to the interior of a tire affixed to the wheel, the sensing device comprising a sensor adapted for collecting sensed data from the vehicle tire, a transmitting device adapted for transmitting the sensed data, a unique identification number, and a removable identification component that is electronically associated with and identified to the sensing device, wherein the identification component comprises the same unique identification number as the sensing device, wherein the identification component is removable from the sensing device and receivable with a port of a system receiver; and
a system receiver adapted to receive the sensed data from the sensor and to provide the sensed data to a vehicle user, one or more ports for receiving one or more identification components, wherein engaging the system receiver with an identification component enables the system receiver to correlate data received from the sensing device electronically associated with the identification component to that identification component.

2. The tire monitoring system of claim 1, wherein the opening of the wheel of the vehicle is disassociated with an opening engaging an air valve stem of the wheel.

3. The tire monitoring system of claim 1, wherein the data transmitted from the sensing device to the system receiver comprises the unique identification number of the sensing device, wherein the system receiver receiving the data can match the transmitted data to the identification component comprising the matching identification number.

4. The tire monitoring system of claim 3, wherein the one or more ports for receiving one or more identification components correspond to one or more tire locations on the vehicle, wherein engaging the system receiver with an identification component corresponding to the tire location of the electronically associated sensing device enables the system receiver to correlate data received from the sensing device to the tire location of the sensing device from which the data was transmitted.

5. The tire monitoring system of claim 4, wherein the system receiver provides to a vehicle user the sensed data from a tire and the location of the tire from which the data was collected.

6. The tire monitoring system of claim 1, wherein the data is provided to the user in real time.

7. The tire monitoring system of claim 1, wherein the sensing device comprises a pressure sensor adapted for collecting tire pressure data.

8. The tire monitoring system of claim 1, wherein the sensing device comprises a temperature sensor adapted for collecting tire temperature data.

9. The tire monitoring system of claim 1, wherein the sensing device comprises a pressure and/or temperature sensor adapted for collecting tire pressure and/or temperature data.

10. The tire monitoring system of claim 9, wherein the system receiver is adapted to indicate to the user the sensed data from a tire and the location of the tire when the tire pressure and/or temperature exceeds a predetermined maximum threshold or falls below a predetermined minimum threshold.

11. The tire monitoring system of claim 1, wherein the sensor further comprises:
a housing for the sensing device and transmitting device;
an engaging member comprising a threaded fastener for securing the sensing device to the wheel; and
a power supply.

12. The tire monitoring system of claim 11, wherein the power supply comprises a low voltage battery.

13. The tire monitoring system of claim 1, wherein the system receiver further comprises a data processor for processing the data received from the sensor.

14. The tire monitoring system of claim 1, wherein the system receiver further comprises a display unit for displaying the data to the user.

15. The tire monitoring system of claim 1, wherein the transmitting device is operable to transmit data using a radio frequency signal, inductive signal, ultrasonic signal, an infrared signal, or combinations thereof.

16. The tire monitoring system of claim 1, wherein the system is adapted for use in off-the-road (OTR) vehicles.

17. A tire monitoring system for a vehicle, comprising:
(a) at least one sensing device adapted for engaging an opening of a wheel of a vehicle such that the sensing device is exposed to the interior of a tire affixed to the wheel, the sensing device comprising:
a sensor adapted for collecting data from the vehicle tire, a unique identification number, and a transmitting device adapted for transmitting the data, wherein the transmitted data comprises the unique identification number; and
(ii) a removable identification component that is electronically associated with and identified to the sensing device, wherein the identification component comprises the same unique identification number as the sensing device, wherein the identification component is adapted to be removed from the sensing device and to engage a port of a system receiver; and
(b) a system receiver adapted to receive the data from the sensing device and to provide the data to a vehicle user, the system receiver comprising:
(i) a data processor for processing the data received from the sensor;

(ii) a display unit for displaying the data to the user; and (iii) one or more ports for receiving one or more identification components, wherein the one or more ports for receiving one or more identification components correspond to one or more tire locations on the vehicle, wherein engaging the system receiver with an identification component corresponding to the tire location of the electronically associated sensor enables the system receiver to correlate data received from the sensing device to the tire location of the sensing device from which the data was transmitted.

18. The tire monitoring system of claim 17, wherein the data is provided to the user in real time.

19. The tire monitoring system of claim 17, wherein the sensor is a pressure and/or temperature sensor adapted for collecting tire pressure and/or temperature data.

20. A method of monitoring a tire of a vehicle, the method comprising:
 (a) providing a sensing device adapted for engaging an opening of a wheel of a vehicle, the sensing device comprising:
  (i) a unique identification number;
  (ii) a sensor adapted for collecting data from the vehicle tire, and a transmitting device adapted for transmitting the data; and
  (iii) a removable identification component that is electronically associated with and identified with the sensing device, wherein the identification component comprises the same unique identification number as the sensing device, wherein the identification component is adapted to be removed from the sensing device and to engage a port of a system receiver;
 (b) providing a system receiver adapted to receive the data from the sensing device and to provide the data to a vehicle user, the system receiver comprising:
  (i) one or more ports for receiving one or more identification components, wherein the one or more ports for receiving one or more identification components correspond to one or more tire locations on the vehicle;
  (ii) a data processor for processing the data received from the sensor; and
  (iii) a display unit for displaying the data to the user;
 (c) engaging a port of the system receiver with an identification component of the sensing device, wherein the port that is engaged corresponds to the tire location of the sensing device;
 (d) collecting data from the vehicle tire using the sensor, and transmitting the data to the system receiver using the transmitting device; and
 (e) processing the data using the data processor and displaying the data to the user using the display unit, wherein the user is provided the sensed data from a tire and the location of the tire from which the data was collected.

21. The method of claim 20, wherein the data transmitted from the sensing device to the receiver comprises the unique identification number of the sensing device, wherein the system receiver receiving the data can match the transmitted data to the identification component comprising the matching identification number.

22. The method of claim 21, wherein engaging the system receiver with an identification component corresponding to the tire location of the electronically associated sensing device enables the system receiver to correlate data received from the sensing device to the tire location of the sensing device from which the data was collected and transmitted.

23. The method of claim 20, wherein the data comprises tire pressure data.

24. The method of claim 20, wherein the data comprises tire temperature data.

25. The method of claim 20, wherein the data comprises tire pressure and/or tire temperature data.

26. The method of claim 20, wherein the vehicle comprises an off-the-road vehicle.

27. The method of claim 20, wherein the data is displayed to the user in real time.

* * * * *